(12) United States Patent
Tohda et al.

(10) Patent No.: US 6,447,049 B1
(45) Date of Patent: Sep. 10, 2002

(54) STRUCTURE FOR FRONT BODY OF VEHICLE

(75) Inventors: Isao Tohda, Hiroshima (JP); Yukio Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/712,274

(22) Filed: Nov. 15, 2000

(51) Int. Cl.$^7$ ............................................... B62D 37/02
(52) U.S. Cl. ..................... 296/180.1; 296/185; 293/117; 293/136
(58) Field of Search ............................. 296/180.1, 185; 293/136, 117

(56) References Cited

U.S. PATENT DOCUMENTS

| | | | |
|---|---|---|---|
| 3,791,468 A | | 2/1974 | Bryan, Jr. |
| 3,922,014 A | * | 11/1975 | Hinderks ..................... 293/120 |
| 4,867,397 A | * | 9/1989 | Pamadi et al. ............ 296/180.1 |
| 4,904,016 A | * | 2/1990 | Tatsumi et al. ............ 293/117 X |
| 5,403,059 A | * | 4/1995 | Turner ..................... 296/180.1 X |
| 5,458,391 A | * | 10/1995 | Ito et al. ..................... 296/180.1 |
| 5,924,756 A | * | 7/1999 | Homa ..................... 296/180.1 X |

FOREIGN PATENT DOCUMENTS

| | | |
|---|---|---|
| DE | 199 11 833 | 9/1999 |
| FR | 2 445 783 | 1/1979 |
| JP | 05-069861 | 3/1993 |
| JP | 08310450 | 11/1996 |
| JP | 10218022 | 8/1998 |

\* cited by examiner

Primary Examiner—Stephen T. Gordon
Assistant Examiner—Lori L Coletta
(74) Attorney, Agent, or Firm—Nixon Peabody LLP; Donald R. Studebaker

(57) ABSTRACT

A pedestrian protective front body structure for a vehicle includes a front spoiler provided with desired aerodynamic characteristics and disposed with a separation above from a nose front end of the vehicle body and is provided with a buffer which buffers an impact against the front spoiler from above upon an occurrence of a frontal clash with a pedestrian.

11 Claims, 11 Drawing Sheets

STRUCTURE FOR FRONT BODY OF VEHICLE

BACKGROUND OF THE INVENTION

1. Field of the Invention

The present invention relates to a structure for a front body of a vehicle and, more particular, to a front body structure for a vehicle provided with a front spoiler for improvement in aerodynamic characteristics which is separated upward from a nose panel of a front body and extends in a transverse direction of a vehicle body.

2. Description of Related Art

Front body structures improved in aerodynamic characteristics have been proposed in various forms. One of the front body structures, which is known from, for instance, Japanese Unexamined Patent Application No. 5-69861, includes an inclined nose panel and a front bumper disposed upward from the nose panel so as to work as a floating type of front spoiler. While the front body equipped with this floating type of front spoiler has an advantage in that it can provide a low hood line irrespective of disposing a front bumper at a desired height and can realize improved aerodynamic characteristics. However, the front body has difficulty in protecting a pedestrian upon an occurrence of a frontal clash against the pedestrian.

SUMMARY OF THE INVENTION

It is an object of the present invention to provide a front body structure for a vehicle which is equipped with a front spoiler disposed with a separation above from a front nose end and extending in a transverse direction of the front body and which ensures desired aerodynamic characteristics and protection of a pedestrian.

It is another object of the present invention to provide a front body structure for a vehicle which is equipped with a buffering front spoiler disposed with a separation above from a front nose end and extending in a transverse direction of the front body and which is capable of absorbing energy of an external impact from above.

It is another object of the present invention to provide a front body structure for a vehicle which is equipped with a front spoiler capable of changing in shape by energy of an external impact greater than specified energy and which provides improvement in pedestrian protection upon an occurrence of a frontal clash against a pedestrian.

It is another object of the present invention to provide a front body structure for a vehicle which is equipped with a front spoiler provided with a core member extending in a transverse direction of and secured to the front body having a deformation part capable of changing in shape by the greater-than-specified energy of an external impact at the middle thereof and which ensures improvement in pedestrian protection upon an occurrence of a frontal clash against a pedestrian.

It is another object of the present invention to provide a front body structure for a vehicle which is equipped with a front spoiler supported at opposite ends in a transverse direction of the front body by supporting members capable of changing in shape when receiving energy of an external impact thereon upon an occurrence of a frontal clash and which ensures improvement in pedestrian protection upon an occurrence of a frontal clash against a pedestrian.

It is another object of the present invention to provide a front body structure for a vehicle which is equipped with a front spoiler integrally formed with intermediate supporting member capable of changing in shape when receiving energy of an external impact thereon upon an occurrence of a frontal clash and which ensures improvement in pedestrian protection upon an occurrence of a frontal clash against a pedestrian.

It is still another object of the present invention to provide a front body structure for a vehicle in which a front spoiler is installed with a forward end thereof disposed in a position near and above a front bumper and which, when the vehicle has a frontal clash with a pedestrian and the front bumper hits and sweeps legs of the pedestrian, the front spoiler stops the upper body of the pedestrian so as thereby to protect the upper body from pitching forward toward the hood panel 2.

It is a further object of the present invention to provide a front body structure for a vehicle which includes a cross member for supporting a front bumper, the cross member extending in a transverse direction of the vehicle body and being provided with a tie-down hook by which a radiator disposed in an inside of the front body is supported in an inclined fashion such that energy of an impact against the front bumper is distributed even to the radiator and which enables to control of structural strength of the front body by a combination of the cross member, tie-down hook and radiator, with an effect of increasing the degree of freedom of designing the structural strength of the front bumper and the cross member.

The foregoing objects of the present invention are accomplished by providing a front body for a vehicle which is equipped with a front spoiler disposed with a separation above from a front end of a nose and extending in a transverse direction of the vehicle body. The front spoiler is provided with buffer means for buffering an impact applied thereto from above. The front spoiler is made of a member changeable in shape when receiving specified energy of an impact from above such as an occurrence of a frontal clash with a pedestrian.

The front spoiler may incorporate a core beam member disposed therein and extending in the transverse direction which is secured to part of the vehicle body and is formed with a weak part at a middle section in the transverse direction so as to cause deformation at the weak part when receiving specified energy of an impact from above upon an occurrence of a frontal clash with a pedestrian.

Further, the front spoiler may comprise strut means for fixedly supporting the front spoiler at opposite ends in the transverse direction on the part of the vehicle body which is changeable in shape when receiving specified energy of an impact from above upon an occurrence of a frontal clash with a pedestrian.

The front spoiler may be additionally provided with an integral supporting member extending from a middle of the front spoiler in the transverse direction to the nose which is capable of changing in shape under specified energy of an impact against the front spoiler from above upon an occurrence of a frontal clash with a pedestrian.

Preferably, the front spoiler is installed with a forward end thereof disposed in a position near and above a front bumper. A cross member operative to support the front bumper may be provided such as to extend in the transverse direction and is provided with a tie-down hook by which a radiator disposed in an interior of the front body is supported in an forwardly inclined fashion.

According to the front body structure of the present invention in which the front spoiler is disposed with a separation above from the front end of the nose of the front body in the transverse direction and is provided with the impact buffering means for buffering an external impact from above upon an frontal clash with a pedestrian, the front body is ensured to perform desired aerodynamic performance by the front spoiler. Additionally, the front body realizes ensured pedestrian protection upon an occurrence of a frontal clash by means of alleviating a shock of the clash against the upper body of a pedestrian when the pedestrian is hit by the vehicle so hard that the head of the pedestrian is forced to pitch forward toward the hood panel 2.

The front spoiler which is made of materials that are capable of changing in shape when receiving specified energy of an external impact provides the front body with improved pedestrian protection performance upon an occurrence of a frontal clash against a pedestrian. Furthermore, the front spoiler 12 which incorporates the transversal core beam member disposed in the inside of the front spoiler and formed with a weak part sufficiently fragile enough to cause deformation when receiving specified energy of an external impact thereon and secured at opposite ends to part of the vehicle body ensures more improved pedestrian protection performance due to deformation of the core beam member. In addition, the front spoiler 12 which is fixedly supported on part of the vehicle body at transversally opposite ends by the cushioning supports operative to absorb energy of an impact applied to the front spoiler achieves more ensured pedestrian protection.

The front body which is provided with the front bumper disposed in near front of and below the front spoiler so that the front bumper hits and sweeps legs of a pedestrian when the vehicle has a frontal clash with the pedestrian and then the front spoiler stops the upper body of the pedestrian to absorb energy of an impact of the upper body of the pedestrian pitching forward toward the hood panel achieves more ensured pedestrian protection upon an occurrence of a frontal clash.

Furthermore, the front body which includes a cross member for fixedly supporting the front bumper on the vehicle body having the tie-down hook by which the radiator is supported in a forwardly inclined fashion distributes energy of an impact against the front bumper even to the radiator. This arrangement enables to control of structural strength of the front body by a combination of the cross member, tie-down hook and radiator, so that it can be realized to increase the degree of freedom of designing the structural strength of each of the main front bumper and the cross member.

BRIEF DESCRIPTION OF THE DRAWINGS

The foregoing and other objects and features of the present invention will be understood from the following description in accordance with preferred embodiments thereof when reading in connection with the accompanying drawings in which parts and elements denoted by the same reference numbers are same or similar in structure and operation throughout the drawings, and wherein.

DETAILED DESCRIPTION OF THE PREFERRED EMBODIMENTS

Figure 1:
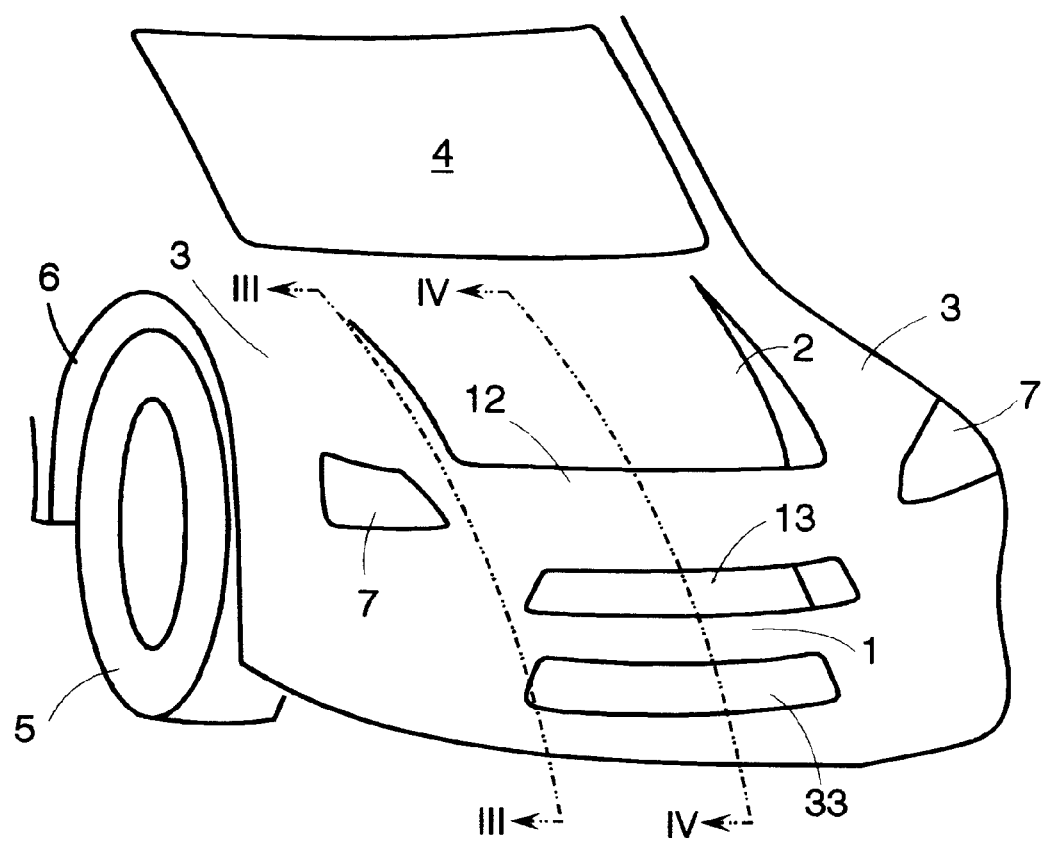
FIG. 1 is a schematic perspective view of a front body section of a vehicle equipped with a front body structure of the present invention.

Referring to the drawings in detail and, in particular, to FIG. 1 showing an external appearance of a front body of a vehicle equipped with a front body structure of the present invention, the front body comprises a nose panel 1 forming a front end of the vehicle body, a hood panel 2 extending rearward at the middle section of the nose panel 1 and front fender panels 3 extending rearward from the nose panel 1 and along opposite sides of the hood panel 2, respectively. The front body is equipped with a front wind shield 4 extending rearward up from the hood panel 2 and wheel housings 6 formed integrally with the front fender panels 3, respectively, which accommodate front wheels 5, respectively. Head lamps 7 are installed to opposite sections of the nose panel 1.

Figure 2:
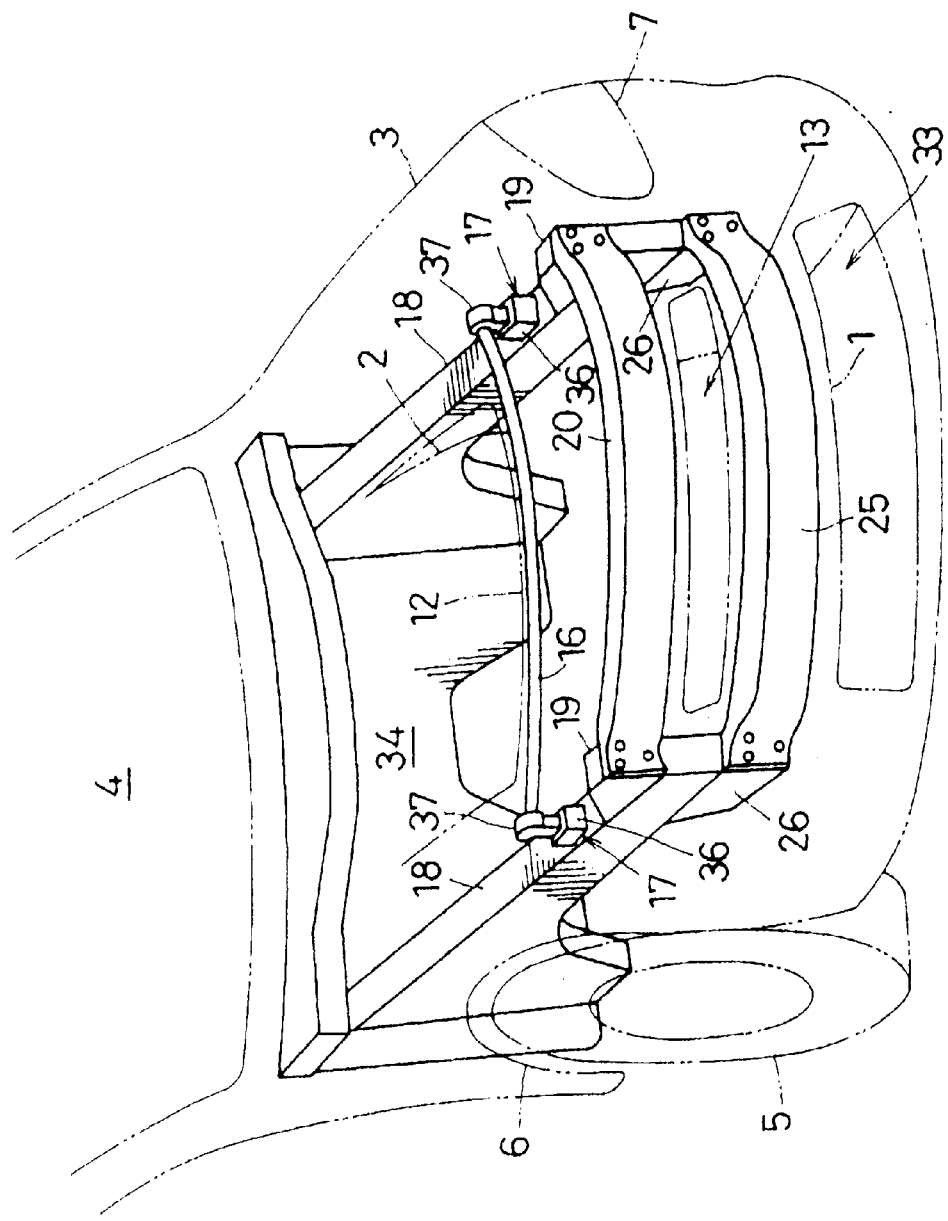
FIG. 2 is a schematic perspective view of a front body structure in accordance with a preferred embodiment of the present invention.
Figure 3:
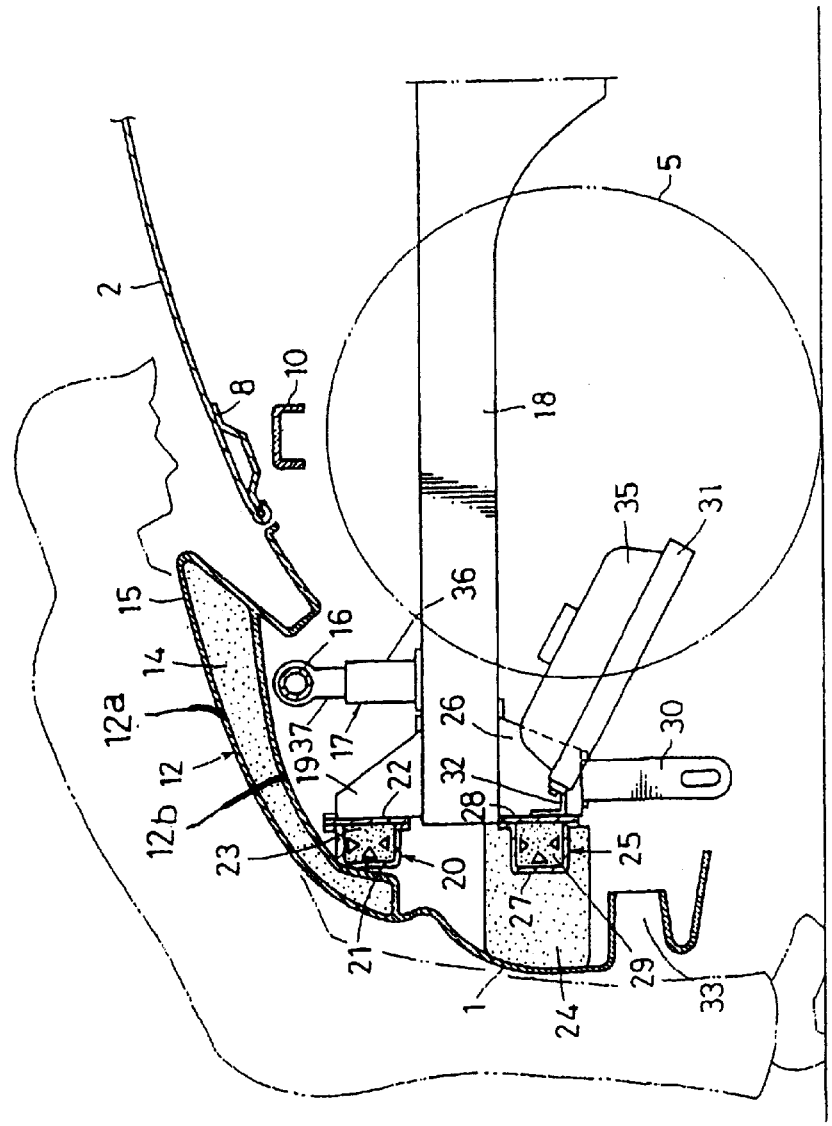
FIG. 3 is a cross-sectional view taken along line III—III of FIG. 1.
Figure 4:
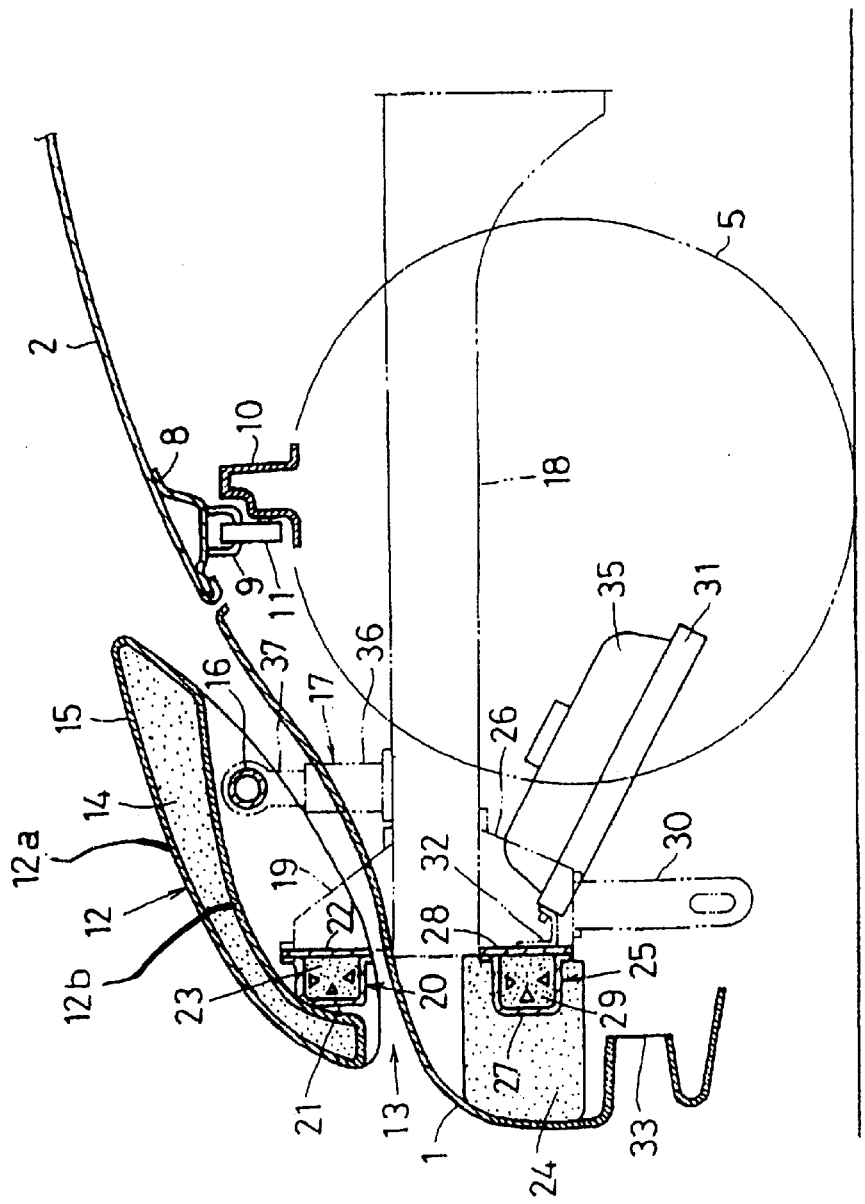
FIG. 4 is a cross-sectional view taken along line IV—IV of FIG. 1.

FIGS. 2 to 4 showing the front body structure arranged before a dash panel 34, the hood 2 is provided with a hood reinforcement 8 secured thereto. The hood reinforcement 8 has a striker 9 secured thereto at the middle in a transverse direction of the front body. The striker 9 is hooked and unhooked by a locking hook 11 secured to a shroud upper panel 10 to lock and unlock the hood panel 2. The front body is equipped with a front spoiler 12 is disposed above the nose panel 1 and extends in the transverse direction. As shown in detail in FIG. 4, the front spoiler is designed in a form of aerodynamic wing having a given aerodynamic configuration (see FIG. 4). Specifically, the front spoiler 12 has an upper streamline surface 12a and a lower streamline surface 12b having a streamline flow path length longer than the upper streamline surface 12a. As shown in FIG. 3, the front spoiler 12 is integrated with the nose panel 1 at opposite sides in the transverse direction so as to form an upper nose section operative as a wing There is provided with an air inlet opening 13 between the nose panel 1 and the front spoiler 12. The front spoiler 12 thus provided is called a front floating type of spoiler which is capable of improving or ensuring aerodynamic characteristics of the vehicle body.

The front spoiler 12 comprises an energy absorption member 14 made of such as foamed polyurethane and a plastic facing member 15 covering the energy absorption member 14.The front spoiler 12 is provided with a stiffner 16 operative as a core beam member which will be described in detail later. As shown in detail in FIGS. 2 and 3, the stiffner 16 extends in the transverse direction and is fixedly supported at opposite ends by cushioning struts 17 secured to front side frames 18 forming the vehicle body, respectively. The front side frames 18 at front ends are provided with upper bracket arms 19 extending upward therefrom for mounting thereto an upper bumper reinforcement 20 therebetween. The upper bumper reinforcement 20 comprises a channel shaped front panel 21 and a rear panel 22 disposed so as to form a closed cross-section between them. The upper bumper reinforcement 20 is filled with a filling material 23 such as formed polyurethane. Further, the front side frames 18 at the front ends are provided with lower bracket arms 26 extending downward therefrom for mounting thereto a lower bumper reinforcement 25 therebetween. The lower bumper reinforcement 25 mounted to the lower bracket arms 26 comprises a channel shaped front panel 27 and a rear panel 28 disposed so as to form a closed cross-section between them. The lower bumper reinforcement 25 is filled with a filling material 29 such as formed polyurethane. A main front bumper 24, which comprises an energy absorption member, is disposed behind the nose panel 1 and below the front portion of the front spoiler 12 at a height lower than an average knee height of pedestrians. The front bumper 24 at its back is supported by the lower bumper reinforcement 25.

The lower bumper reinforcement 25 is provided with a tie-down hook 30 secured thereto through the lower bracket arm 26.

A radiator 31 with a radiator cowling 35 is disposed in the interior of the front body in an inclined fashion in which the front lies in a high position and the back lies in a low position. The radiator 31 at its front end is supported by the lower bumper reinforcement 25 through a bracket 32 secured to the lower bumper bracket reinforcement 25.

The front body is provided with an opening 33 below the front bumper 24 and in front of the radiator 31 for directing wind toward the radiator 31.

Figure 5:
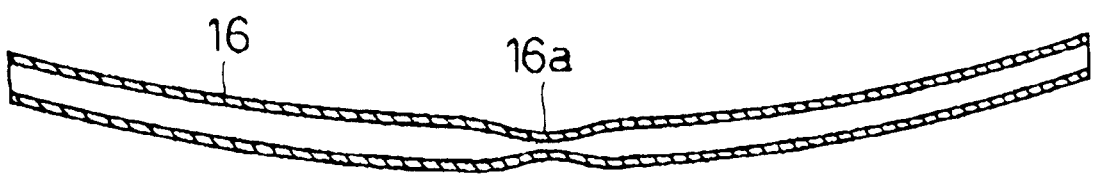
FIG. 5 is a cross-sectional view of a stiffner.
Figure 6:
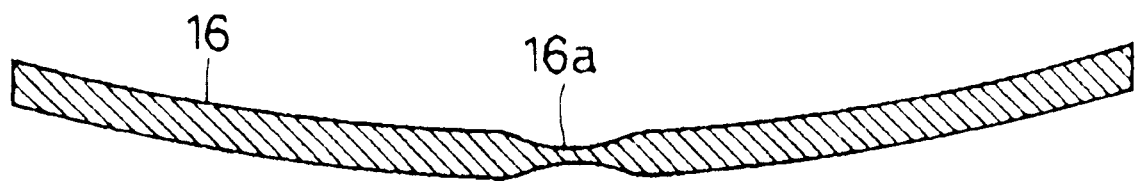
FIG. 6 is a cross-sectional view of another stiffner.

Referring to FIGS. 5 and 6 showing a fragile structure of the stiffner 16, in detail, the stiffner 16 is formed with a weak part 16a at the in-between position, or more desirably at the center position in the transverse direction of the front body. The weak part 16a is sufficiently fragile enough to cause deformation of the stiffner 16 when the stiffner 16 receives energy of an external impact greater than specified energy thereon from the above. The stiffner 16 may be hollow and made of rigid member as a metal pipe as shown in FIG. 5 or may be solid and made of, for example, plastics, fiber-reinforced plastics or alloys.

Figure 7:
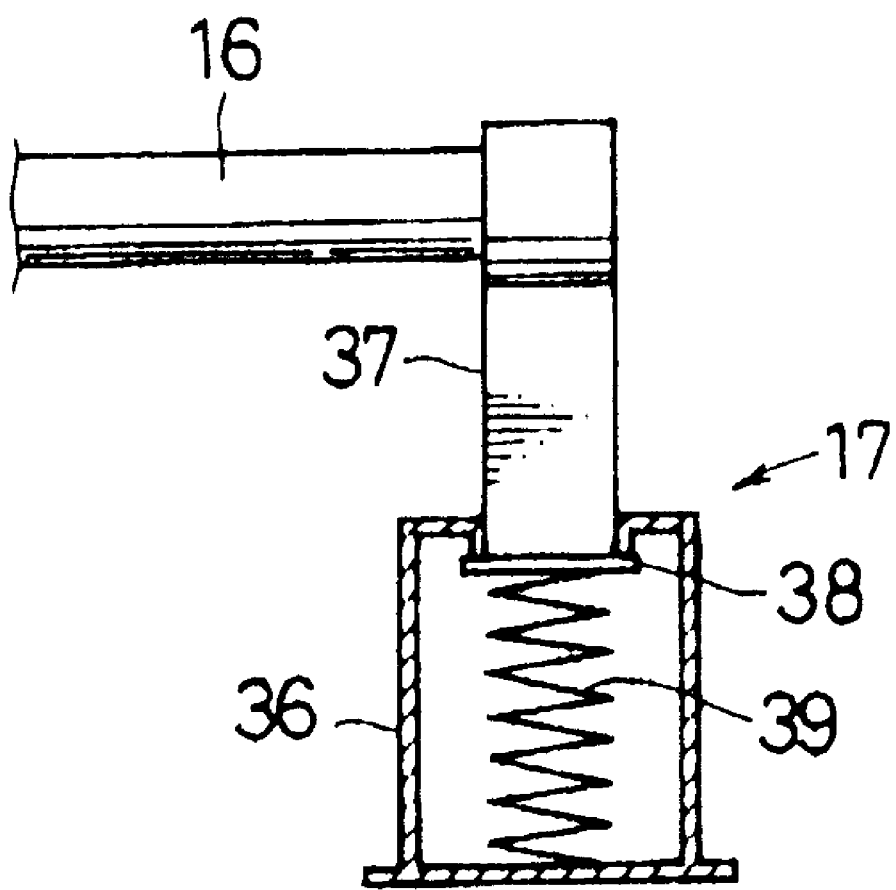
FIG. 7 is an explanatory view of a stiffner supporting structure.

Referring to FIG. 7 showing a cushioning structure of the cushioning strut 17 by which the stiffner 16 is fixedly supported on the front side frame 18 so as to damp shocks, the cushioning strut 17 comprises a cylinder 36 secured to the front side frame 18 and a spring loaded slider 37 received in the cylinder 36 and holding the stiffner 16 at the top end thereof. The slider 37 is forced upward by a spring 39 received in the cylinder 36 and is provided with a stopper 38 for being prevented from slipping out of the cylinder 36, so as to force the slider, and hence the stiffner 16, to a normal upper position. The cushioning strut 17 thus structured absorbs energy of an external vertical impact against the stiffness 16 through compression deformation of the spring 39 in the vertical direction. The front body structure may employ either one or both of the fragile structure of the stiffness 16 shown in FIG. 5 or 6 and the cushioning structure of the cushioning strut 17.

In operation of the front body employing the structure according to the preferred embodiment of the present invention, the front body is blow by apparent wind from the front while the vehicle is running forward. The wind is split into two streamline flows of air. namely an upper streamline flow of air over the front spoiler 12 and an under streamline flow of air under the front spoiler 12, more specifically through the opening 13 between the front spoiler 12 and the nose panel 13. As a result of which, the front spoiler 12 receives down force which is generated according to a difference between velocities of the upper and under streamline flows of air and exerts thereon to press it downward. In consequence, the front body is depressed toward the road, so as to increase road holding force of the front wheels 5, which is desirable to provide improve running stability and increased running safety.

As described above, the front spoiler 12 provides the front body with ensured aerodynamic characteristics with an effect of improving running stability and safety of the vehicle which leads to improvement in running performance of the vehicle.

As shown in FIG. 3, when the vehicle has a frontal clash with a pedestrian, the front bumper 24 hits and sweeps the legs of the pedestrian. Then, while the upper body of the pedestrian is forced to pitch forward toward the hood panel 2, the front spoiler 12 stops the upper body, in particular the abdominal region, of the pedestrian before the upper body of the pedestrian hits the hood panel 12. In this way, the front spoiler 2 absorbs energy of an external impact exerting thereon with an effect of alleviating a shock of clash against the upper body of the pedestrian. As a result, the pedestrian is prevented from hitting his head against the hood panel with a strong impact. In other words, when the front spoiler 12, which comprises an energy absorption member 14 made of such as foamed polyurethane and a plastic facing member 15 covering the energy absorption member 14, receives energy of an external impact greater than the greater-than-specified energy from the pedestrian hit by the vehicle through a frontal clash, it is distorted due to deformation of the energy absorption member 14 and it's own over-all deflection. This distortion of the front spoiler 12 alleviates a shock of clash against the upper body of the pedestrian, so as thereby to realize pedestrian protection upon an occurrence of a frontal clash.

Furthermore, the stiffner 16 having the center weak part 16a deflects at the center weal part 16a when the front spoiler 12 receives the greater-than-specified energy of an external impact thereon from the pedestrian. This deformation of the stifner 16 alleviates a shock of clash against the upper body of the pedestrian, so as thereby to realize ensured pedestrian protection upon an occurrence of a frontal clash.

In the case where the front body includes the cushioning struts 17 for fixedly supporting the stiffner 16, the stiffner 16 absorbs the greater-than-specified energy of an external impact against the front spoiler 12 through down-movement of the spring loaded slider 37 when the pedestrian is hit by the vehicle so hard that the head of the pedestrian is forced to pitch forward to the hood panel 2, it is realized to ensure pedestrian protection upon an occurrence of a frontal clash.

According to the front body structure shown in FIGS. 1 to 7 as a preferred embodiment of the present invention, the front spoiler 12 separated upward from the nose panel 1 of a front body and extending in the transverse direction incorporates an impact buffering feature (the front spoiler capable of changing in shape, the stiffner 16 having the center weak part 16a and the cushioning struts 17), so that, while the front spoiler 12 provides the front body with desired aerodynamic characteristics, it realizes ensured pedestrian protection upon an occurrence of a frontal clash by means of alleviating a shock of the clash against the upper body of a pedestrian when the pedestrian is hit by the vehicle so hard that the head of the pedestrian is forced to pitch forward toward the hood panel 2. Furthermore, since the front spoiler 12 is made of materials that are capable of changing in shape when receiving the greater-than-specified energy of an external impact, the front body of the present invention performs improved pedestrian protection upon an occurrence of a frontal clash with a pedestrian.

Further, since the front spoiler 12 incorporates the stiffner 16, which is disposed and extends in the transverse direction as a core beam member in the inside of the front spoiler 12, is formed with the center weak part 16a so as to be sufficiently fragile enough to cause deformation when receiving specified energy of an external impact thereon and is secured at opposite ends to front side frames 18 as a part of the vehicle body, the front spoiler 12 ensures more improved pedestrian protection performance due to deformation of the stiffner 16 at the center weak part 12a.

In addition, since the front spoiler 12 at opposite ends in the transverse direction is fixedly supported on the front side frames 18 forming part of the vehicle body by the cushioning supports such as struts 17 which absorbs energy of an impact applied to the front spoiler 12, the front spoiler 12 achieves more ensured pedestrian protection.

The main front bumper 24 disposed in near front of and below the front spoiler 12 hits and sweeps the legs of a pedestrian when the vehicle has a frontal clash with the pedestrian and then the front spoiler 12 stops the upper body of the pedestrian before the upper body of the pedestrian pitches forward to the hood panel 2. In this way the front body achieves more ensured pedestrian protection upon an occurrence of a frontal clash.

Furthermore, the lower bumper reinforcement 25 as a cross member for fixedly supporting the main front bumper 24 on the vehicle body is provided with the tie-down hook 30 by which the radiator 31 at the front is supported in an inclined fashion in which the front lies in a high position and the back lies in a low position. By this arrangement, energy of an impact against the main front bumper 24 is distributed even to the radiator 32, which enables to control of structural strength of the front body by the combination of the cross member (the lower bumper reinforcement 25), tie-down hook 30 and radiator 31. In consequence, it can be realized to increase the degree of freedom of designing the structural strength of each of the main front bumper 24 and the cross member (the lower bumper reinforcement 25).

Figure 8:
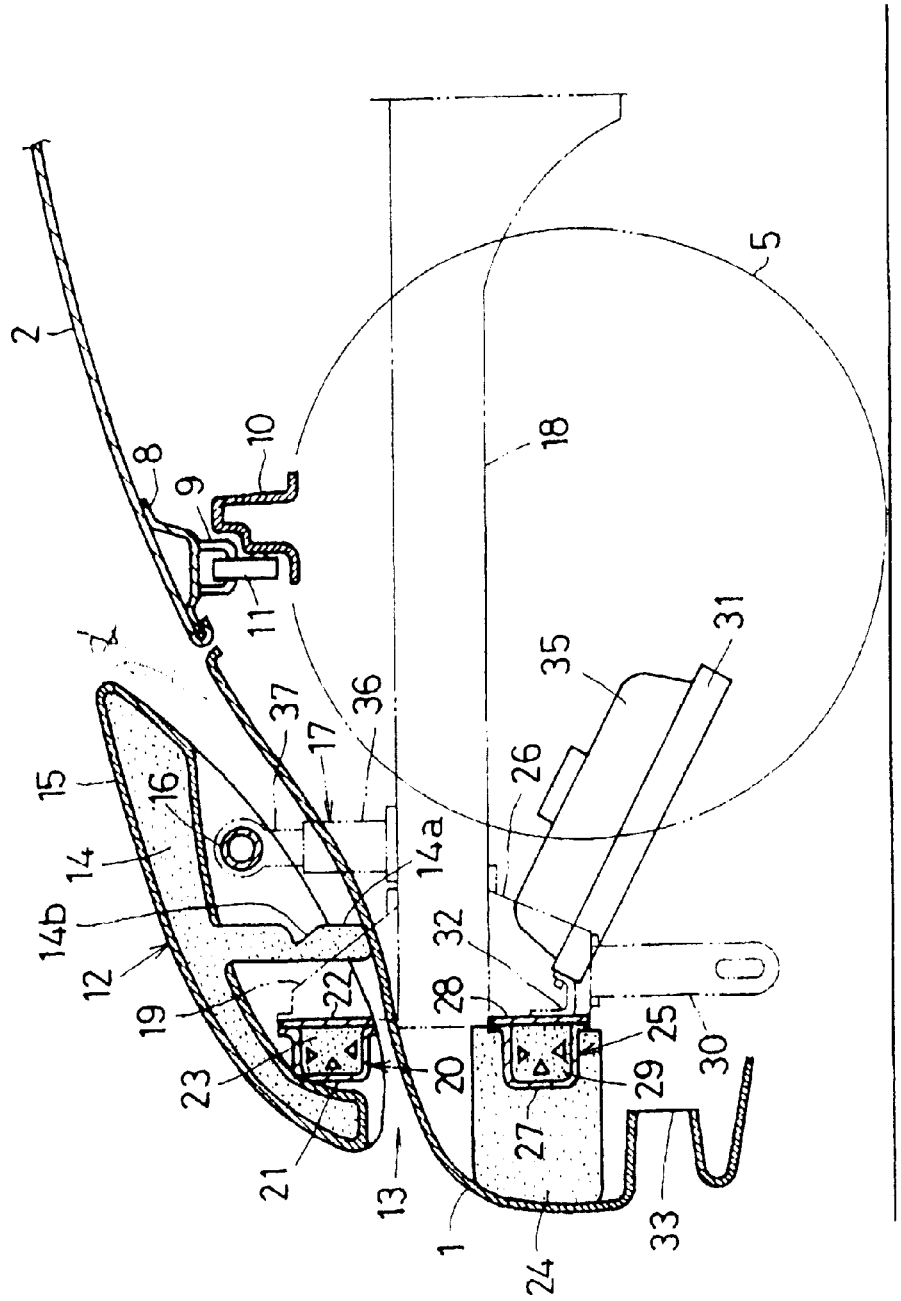
FIG. 8 is a schematic perspective view of a front body structure in accordance with another preferred embodiment of the present invention.
Figure 9:
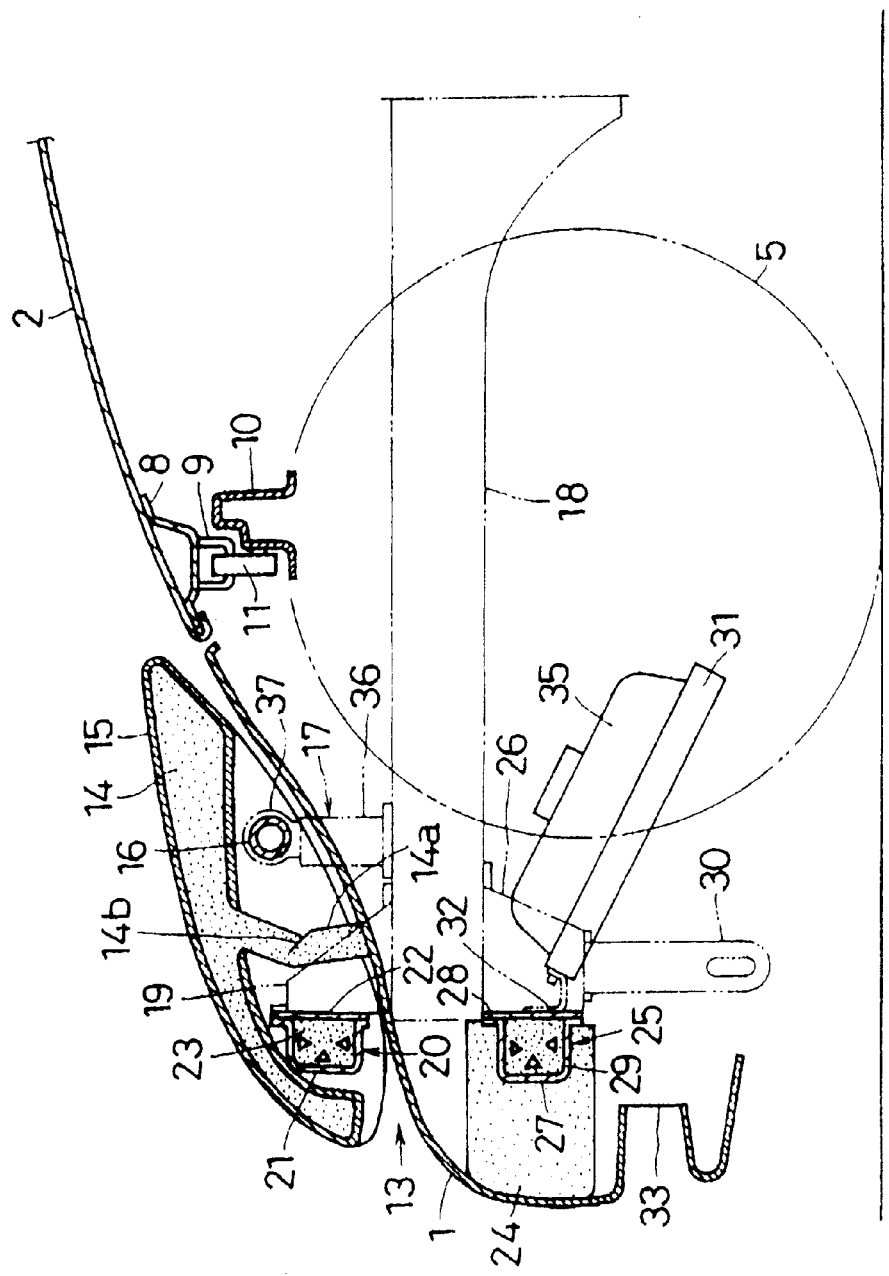
FIG. 9 is an explanatory view showing a deformation of a front spoiler.

FIGS. 8 and 9 show the front body structure according to another preferred embodiment of the present invention. A front spoiler 12 comprises an energy absorption member 14 made of such as foamed polyurethane and a plastic facing member 15 covering the energy absorption member 14. The energy absorption member 14 has an integral supporting leg 14a as an intermediate supporting strut extending downward from the middle section of the energy absorption member 14 in a transverse direction of the vehicle body. The supporting leg 14a is so formed as to support the energy absorption member 14 against the front body. Specifically, the supporting leg 14a at its lower end may be fixedly secured to or may be abutted against the nose panel 1. The supporting leg 14a is formed with a notch 14b at the vertical in-between position, or more desirably at the center position in a vertical direction so as to allow itself to cause a bend along the notch 14b under greater-than-specified energy of an external impact against the front spoiler 12 from above.

In operation of the front body employing the structure according to the preferred embodiment of the present invention, when the vehicle has a frontal clash with a pedestrian, the front bumper 24 hits and sweeps the legs of the pedestrian. Then, while the upper body of the pedestrian is forced to pitch forward toward the hood panel 2, the front spoiler 12 stops the upper body of the pedestrian before the upper body of the pedestrian hits the hood panel 2. At this time, the front spoiler 12 moves down toward the nose panel 1 thereon through a bend of the supporting leg 14a, so as thereby to absorb energy of an external impact exerting thereon from above. This down movement of the front spoiler 12 provides more improved pedestrian protection upon an occurrence of a frontal clash.

Figure 10:
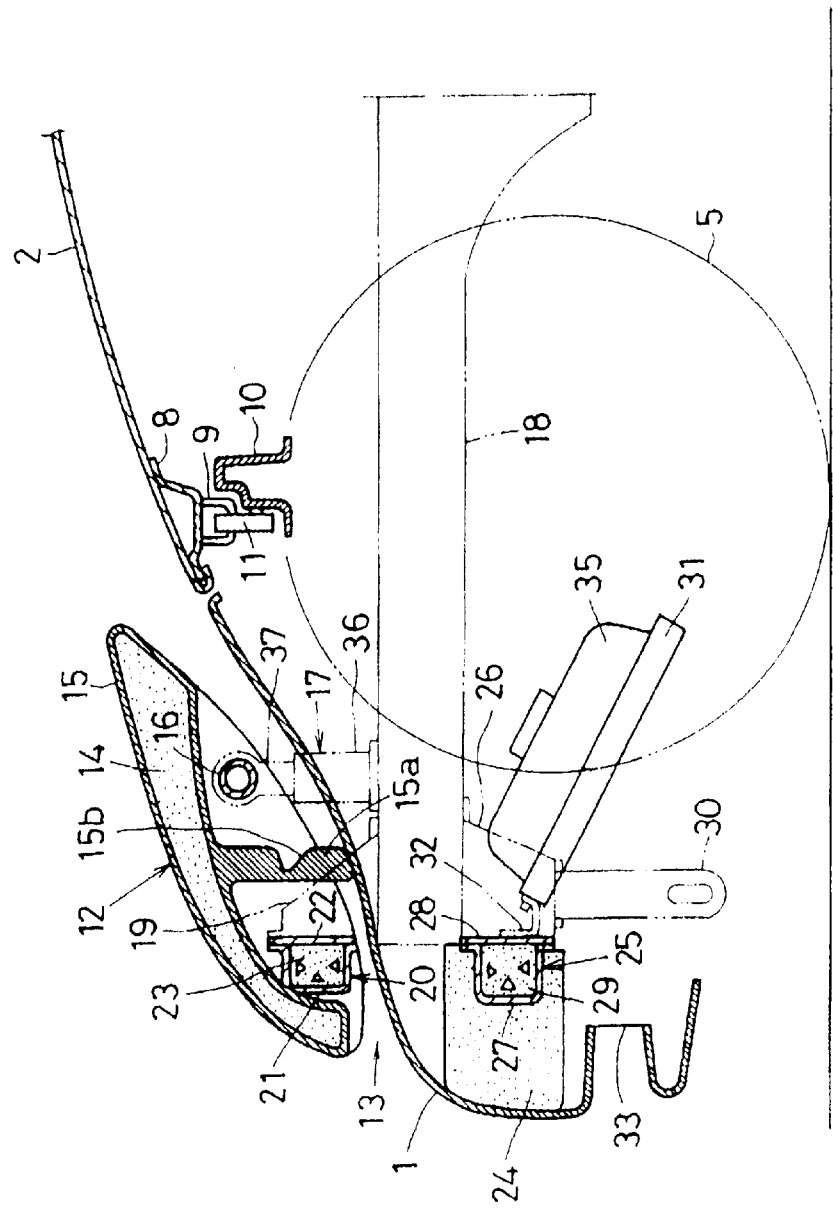
FIG. 10 is a schematic perspective view of a front body structure in accordance with another preferred embodiment of the present invention.

FIG. 10 shows the front body structure according to still another preferred embodiment of the present invention. A front spoiler 12 comprises an energy absorption member 14 made of such as foamed polyurethane and a plastic facing member 15 covering the energy absorption member 14. The plastic facing member 15 has an integral supporting leg 15a as an intermediate supporting strut extending downward from the middle section of the plastic facing member 15 in a transverse direction of the vehicle body. The supporting leg 15a is so formed as to support the energy absorption member 14 against the front body. Specifically, the supporting leg 15a at its lower end may be fixedly secured to or may be abutted against the nose panel 1. The supporting leg 15a is formed with a notch 15b at the vertical in-between position, or more desirably at the center position in a vertical direction so as to allow itself to cause a bend along the notch 15a under greater-than-specified energy of an external impact against the front spoiler 12 from above.

In operation of the front body employing the structure according to the preferred embodiment of the present invention, when the vehicle has a frontal clash with a pedestrian, the front bumper 24 hits and sweeps the legs of the pedestrian. Then, while the upper body of the pedestrian is forced to pitch forward toward the hood panel 2, the front spoiler 12 stops the upper body of the pedestrian before the upper body of the pedestrian hits the hood panel 2. At this time, the front spoiler 12 moves down toward the nose panel 1 thereon through a bend of the supporting leg 15a, so as thereby to absorb energy of an external impact exerting thereon from above. This down movement of the front spoiler 12 provides more improved pedestrian protection upon an occurrence of a frontal clash.

Figure 11:
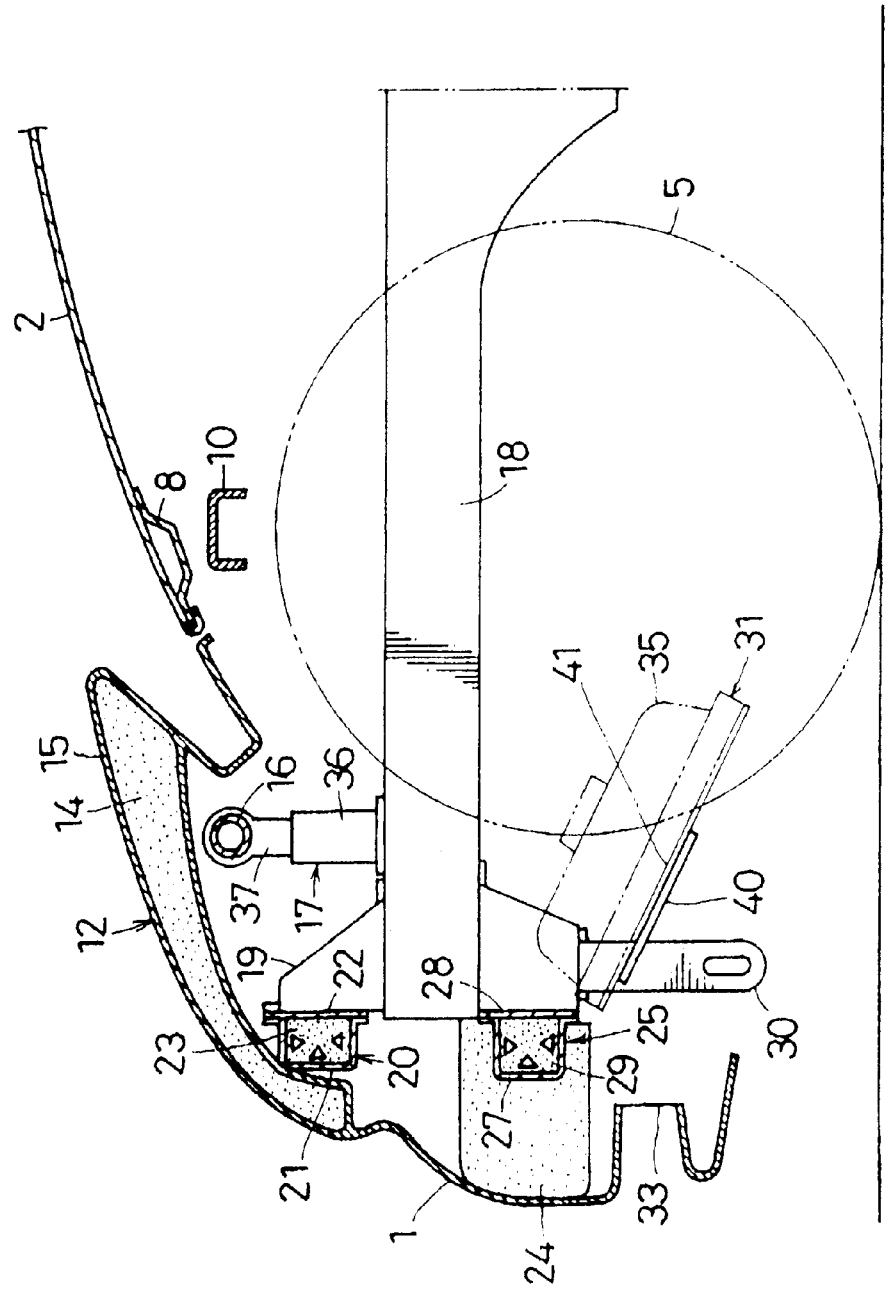
FIG. 11 is a schematic perspective view of a front body structure in accordance with still an further preferred embodiment of the present invention.

FIG. 11 shows the front body structure according to a further preferred embodiment of the present invention. A lower bumper reinforcement 25 is provided with tie-down hooks 30 secured thereto. The tie-down hook 30 is fixedly provided with a supporting bracket 40 such that the supporting bracket 40 extends in an inclined fashion in which the front lies in a high position and the back lies in a low position at the inner side of the tie-down hook 30. A radiator 31 is attached to the tie-down hook 30 by bolting, or otherwise securing a radiator bracket 41 to the supporting bracket 40. The radiator 31 is disposed in the interior of the front body in an inclined fashion in which the front lies in a high position and the back lies in a low position.

In the front body structure according to the preferred embodiment of the present invention in which the lower bumper reinforcement 25 as a cross member for fixedly supporting the main front bumper 24 on the vehicle body is provided with the tie-down hook 30 by which the radiator 31 is supported in an inclined fashion, energy of an impact against the main front bumper 24 is distributed even to the radio 31. This arrangement enables to control of structural strength of the front body of the combination of the cross member (the lower bumper reinforcement 25). tie-down hook 30 and radiator 31, which can realize increasing the degree of freedom of designing the structural strength of each of the main front bumper 24 and the cross member (the lower bumper reinforcement 25).

In the various embodiments described above, it is preferred to employ a plastic nose panel 1 and also to employ a material for the main front bumper 24 which has hardness greater than that for the energy absorption member 14 in the light of hitting legs of a pedestrian upon an occurrence of a frontal clash.

It is to be understood that although the present invention has been described with regard to various preferred embodiments thereof, various other embodiments and variants may occur to those skilled in the art, which are within the scope and spirit of the invention, and such other embodiments and variants are intended to be covered by the following claims.

What is claimed is:

1. A front body structure for a vehicle equipped with a front spoiler that is disposed with a separation from a front end of a nose of a vehicle body and extends in a transverse direction of the vehicle body, said front spoiler comprising:

a wing having a given aerodynamic configuration;

supporting means for supporting said wing to said vehicle body;

buffer means for buffering an impact against said wing from above; and a core beam member incorporated in said front spoiler, extending in said transverse direction and secured to part of said vehicle body, said core beam being formed with a weak part at a middle section in said transverse direction so as to cause deformation at said weak part when receiving specified energy of an impact.

2. A front body structure as defined in claim 1, wherein said front spoiler is made of a member changeable in shape when receiving specified energy of an impact from above.

3. A front body structure as defined in claim 1, wherein said front spoiler is installed with a forward end thereof disposed in a position near and above a front bumper.

4. A front body structure for a vehicle equipped with a front spoiler that is disposed with a separation from a front end of a nose of a vehicle body and extends in a transverse direction of the vehicle body said front spoiler comprising:

a wing having a liven aerodynamic configuration;

supporting means for supporting said wing to said vehicle body;

buffer means for buffering an impact against said wing from above; and strut means for fixedly supporting said front spoiler at opposite ends in said transverse direction on part of said vehicle body, said strut means being changeable in shape when receiving, specified energy of an impact from above.

5. A front body structure as defined in claim 4, wherein said front spoiler is made of a member changeable in shape when receiving specified energy of an impact from above.

6. A front body structure as defined in claim 4, wherein said front spoiler is installed with a forward end thereof disposed in a position near and above a front bumper.

7. A front body structure for a vehicle equipped with a front spoiler that is disposed with a separation from a front end of a nose of a vehicle body and extends in a transverse direction of the vehicle body, said front spoiler comprising:

a wing, having a given aerodynamic configuration;

supporting means for supporting said wing to said vehicle body;

buffer means for buffering an impact against said vine from above; and an intermediate supporting member formed as an integral part of said front spoiler so as to extend from a middle of the front spoiler in said transverse direction to said nose, said intermediate supporting member being capable of changing in shape under specified energy of an impact against said front spoiler from above.

8. A front body structure as defined in claim 7, wherein said front spoiler is made of a member changeable in shape when receiving specified energy of an impact from above.

9. A front body structure as defined in claim 7, where said front spoiler is installed with a forward end thereof disposed in a position near and above a front bumper.

10. A front body structure for a vehicle equipped with a front spoiler that is installed with a forward end thereof disposed in a position near and above a front bumper, is disposed with a separation from a front end of a nose of a vehicle body and extends in a transverse direction of the vehicle body, said front spoiler comprising:

a wing having a given aerodynamic configuration;

supporting means for supporting said wing to said vehicle body;

buffer means for buffering an impact against said wing from above; and a cross member operative to Support said front bumper, said cross member extending in said transverse direction and being provided with a tie-down hook by which a radiator disposed in an interior of said front body is supported in an inclined fashion.

11. A front body structure as defined in claim 10, wherein said front spoiler is made of a member changeable in shape when receiving, specified energy of an impact from above.

* * * * *